United States Patent [19]

Chevigne et al.

[11] Patent Number: 4,689,077
[45] Date of Patent: Aug. 25, 1987

[54] METHOD FOR MANUFACTURING A REACTION-SINTERED METAL/CERAMIC COMPOSITE BODY AND METAL/CERAMIC COMPOSITE BODY

[75] Inventors: Michel Chevigne; Dominique Darracq, both of Annemasse, France; Jean-Pol Wiaux, Croix de Rozon, Switzerland

[73] Assignee: ELTECH Systems Corporation, Boca Raton, Fla.

[21] Appl. No.: 864,390

[22] Filed: May 19, 1986

[30] Foreign Application Priority Data

May 20, 1985 [EP] European Pat. Off. ........ 85810238.7
Nov. 6, 1985 [EP] European Pat. Off. ........ 85810515.8

[51] Int. Cl.$^4$ ............................................. C22C 29/12
[52] U.S. Cl. ....................................... 75/233; 75/235; 75/237; 75/238; 75/244; 419/12; 419/13; 419/17; 419/18; 419/19; 419/23; 419/28; 419/30; 419/55; 419/56; 419/57
[58] Field of Search ........................ 419/10, 12, 13, 14, 419/17, 18, 19, 23, 28, 30, 55, 56, 57; 75/233, 235, 237, 238, 244

[56] References Cited

U.S. PATENT DOCUMENTS

| 1,981,719 | 11/1939 | Comstock | 75/233 |
| 2,033,513 | 3/1939 | Comstock | 75/233 |
| 3,031,300 | 4/1962 | Deutsch | 419/5 |
| 3,360,348 | 12/1967 | Schreiner | 419/5 |
| 3,783,494 | 1/1974 | Whalen et al. | 419/38 |
| 4,514,268 | 4/1985 | DeAngelis | 204/67 |
| 4,534,835 | 8/1985 | DeAngelis | 204/67 |
| 4,540,475 | 9/1985 | DeAngelis | 204/67 |
| 4,585,618 | 4/1986 | Fresnel et al. | 419/12 |
| 4,605,633 | 8/1986 | DeAngelis | 501/87 |
| 4,605,634 | 8/1986 | DeAngelis | 501/96 |
| 4,610,726 | 9/1986 | King | 75/233 |

Primary Examiner—Stephen J. Lechert, Jr.

[57] ABSTRACT

A method is disclosed for manufacturing a reaction sintered composite article which comprises at least one ceramic component. The method comprises preparing a particulate mixture of precursor powders leading to the formation of said composite material upon reaction sintering, pressing said particulate mixture to a self-sustaining body, heating said body up to a temperature below the temperature at which the reaction sintering is initiated, comminuting the heat treating body, selecting particles of a suitable grain size distribution, pressing said particles into shapes of desired size and configuration, and heating said shapes up to a temperature at which the reaction sintering is initiated. The reaction sintered body comprises borides, carbides, nitrides or silicides of a transition metal of the groups IVb, Vb or VIb of the periodic table (comprising titanium, hafnium, zirconium, vanadium, niobium, tantalum, chromium, molybdenum and tungsten), and a metal oxide. In the case that the composite material comprises $Al_2O_3$, $TiB_2$ and facultatively Al, the precursor powder may comprise $TiO_2$, $B_2O_3$ and Al. Composite bodies of sizes, shapes, varying compositions or other particular configurations which do not allow for the preparation of the final bodies in one operation are produced by preparing sub-sections of precursor shapes which are pressed in a first pressing operation, assembled to a shape of essentially the final configuration, again pressed and reaction sintered.

18 Claims, No Drawings

METHOD FOR MANUFACTURING A REACTION-SINTERED METAL/CERAMIC COMPOSITE BODY AND METAL/CERAMIC COMPOSITE BODY

FIELD OF INVENTION

The invention relates to a method for manufacturing a body of a composite material by reaction sintering, comprising at least two materials selected from a group consisting of borides, carbides, nitrides or silicides of a first metal being a transition metal of the groups IVb, Vb or VIb of the periodic table (consisting of titanium, hafnium, zirconium, vanadium, niobium, tantalum, chromium, molybdenum and tungsten), a second metal, and an oxide of said second metal.

The invention also relates to a body made of a reaction sintered composite material comprising at least two materials selected from a group consisting of borides, carbides, nitrides or silicides of a first metal being a transition metal of the groups IVb, Vb or VIb of the periodic table (consisting of titanium, hafnium, zirconium, vanadium, niobium, tantalum, chromium, molybdenum and tungsten), a second metal, and an oxide of said second metal.

The invention further relates to the use of said composite body as component for fused salt metal winning cells. Other uses are also envisaged and comprise e.g. structural ceramics, engine components, cutting tools, erosion wear hardness applications, resistive heating elements and the like.

Finally, the invention relates to a method of preparing bodies of dimensions which may not easily be produced in one operation.

BACKGROUND OF INVENTION

Copending U.S. patent application Ser. No. 580,532 (U.S. Pat. No. 4,585,618) (Canadian patent application No. 447,647 filed on Feb. 16, 1984) discloses the production of metal/ceramic composite bodies comprising materials as mentioned in the preamble, i.e. borides, nitrides, carbides or silicides of at least one of titanium, hafnium and zirconium, a metal and an oxide of said metal. The disclosed method of producing these composite bodies comprises the reaction sintering of a mixture of precursor powders containing an oxide of the transition metal, boron oxide (in the case of the desired resulting compound of the transition metal being a boride) and e.g. aluminum as a metallic component of the reaction mixture. The resulting metal/ceramic composite, which will be further referred to as "cermet" comprises e.g. aluminum as the metal component; a minor amount of which (less than 20%) may come from excess aluminum powder added to the precursor mixture, the major part or, in the case of no excess aluminum in the precursor, all of it comes from infiltration of liquid aluminum during the sintering which is carried out under liquid aluminum.

Other examples for such processes are described in U.S. application Nos. 454,669; 454,670 (U.S. Pat. No. 4,514,268); 454,671 (U.S. Pat. No. 4,605,634); 454,672 (U.S. Pat. No. 4,540,475); 454,673 (U.S. Pat. No. 4,605,633); 454,674 (U.S. Pat. No. 4,534,835) and 626,451 (U.S. Pat. No. 4,610,726); (Canadian application Nos. 440,745; 440,729 and 440,744; all filed on Nov. 8, 1983 in the name of Corning Glass Works). In these publications ceramic or ceramic-metal bodies are produced by admixing powders of $TiH_2$ and $AlB_2$, the reaction sintering yielding an intimately mixed composite body comprising $TiB_2$ and Al, whereby $H_2$ is evolved. In other described examples $TiO_2$ or TiN together with metallic aluminum and boron is used to produce composite bodies of $TiB_2$ and $Al_2O_3$ or $TiB_2$ and AlN respectively.

For a variety iof applications it is of great importance that the microstructure of the sintered body be sufficiently homogeneous to comply with the stringent requirements of the chemical and physical environment in which these articles are used, e.g. in fused-salt aluminum production cells which operate at temperatures near 1000° C. in a highly reactive environment. Other uses of such materials may be envisaged in the automotive industry for structural parts of internal combustion engines or other machines, subject to mechanical and heat cycling stresses, or for cutting tools, where special properties like hardness are requested, which may be negatively affected by deficiencies in the microstructure.

The above U.S. patent application Ser. No. 580,532 (Canadian patent application No. 447,647) also reports that it may be advantageous to pre-sinter the pressed precursor body at temperatures below the temperature at which the reaction sintering is initiated. Compared with simply pressed precursor pellets which are very brittle and therefore difficult to handle, this pre-sintered bodies of unreacted but ductile precursors can be machined, stored or transported prior to the reaction sintering.

For particular applications of these known reaction sintered cermets such as for components in fused salt electrowinning cells, the contact of these cermets with molten metal requires in addition to a very homogeneous microstructure, a very fine grain size and a density which approaches the theoretical density.

The material according to the above U.S. patent application represents already a considerable improvement over other known materials, however, further optimization of the microstructural aspects of the material are desirable. Effects like grain boundary corrosion, erosion and so forth are more severe when agglomerations of grains of the same compound of a multi-compound composite body are built. It is therefore desirable, to produce a material, the respective grains of the different components of which are uniformly distributed without forming agglomerations of grains of the same nature.

The final microstructure may be influenced already by the choice of the particular precursor material, by operating parameters such as pressure, temperature, duration and slope of the heat treatment and so forth. However, a permanent, not yet resolved problem appears when articles of substantial dimensions are produced, since the ratio of the volume of the precursor powder to the volume of the pressed shape is in many cases relatively high and the pressing operation therefore already produces inhomogeneities throughout the pressed body. This drawback may in principle be overcome by isostatically pressing; however, isostatically pressing of large shapes which undergo a substantial reduction of volume is very difficult and expensive and yields shapes of irregular surfaces which have to be machined. Shapes of complicated structures are practically impossible tq be isostatically pressed.

It is known to combine smaller pieces of ceramic or cermet bodies by assembling surfaces of the individual pieces to be joined with an intermediary precursor powder and reaction sintering to produce a joint which may be of the same material as the joined pieces or of a different one. In both cases it is impossible, however, to obtain a final microstructure which is homogeneous across the joint.

OBJECTS OF THE INVENTION

It is an object of the invention to provide a composite material with improved microstructure capable of withstanding attack by molten metal.

It is a particular object of the invention to produce a composite material or a body thereof with improved microstructure and density.

It is a further object of the invention to provide a method of manufacturing a composite body which has the required microstructure and density.

Finally, it is an object of the present invention to provide a method of preparing bodies of dimensions which may not easily be produced in one operation.

SUMMARY OF INVENTION

The above objects and also others which will be apparent in the following detailed description of the invention are met with a method for manufacturing a cermet body and with this cermet body as described under the heading "Field of invention", which which method comprises providing a particulate mixture of precursors leading to the formation of the said metal/ceramic composite material upon reaction sintering; pressing said particulate mixture to a self-sustaining body; heating said body up to a temperature below the temperature at which the reaction sintering is initiated; comminuting the heat treated body; selecting particles of a suitable grain size distribution (e.g. smaller than 28 micrometers or between 28 and 45 micrometers according to two of the below examples); pressing said selected particles to shapes of desired size and configuration; and heating said shapes up to a temperature at which the reaction sintering is initiated.

Cermet bodies of large sizes, particular shapes, non-uniform compositions or other special configurations which are difficult to prepare in one single operation may be produced by providing several sub-sections in a series of first operations including presintering, comminuting and reconsolidation, whereafter these sub-section are assembled to a precursor shape of essentially the final dimensions, pressed in a second pressing operation and heated to a temperature at which reaction sintering is initiated.

Bodies made of the reaction sintered composite material have a ceramic component comprising at least one material selected from an oxide of a metal, a boride, nitride, carbode or silicide of at least one of the transition metals of the groups IVb, Vb or VIb of the periodic table (comprising titanium, hafnium, zirconium, vanadium, niobium, tantalum, chromium, molybdenum and tungsten), the composite material having a micro-structure which is a uniform distribution of single grains of the reaction products. This microstructure may be obtained by the method as described above.

The composite bodies may be used for components for fused salt metal winning cells, such as aluminum reduction cells, in particular for components which are normally at least partially in contact with molten metal, in particular aluminum.

Other uses such as for structural ceramics, engine components, cutting tools, erosion wear hardness applications, resistive heating elements and the like are envisaged and covered by the scope of the present invention, wherein the respective mechanical, electrical or thermal properties are advantageous.

DETAILED DESCRIPTION OF THE INVENTION

In a preferred embodiment the composite material may comprise at least one ceramic component and a metal. In particular this preferred embodiment may comprise titanium diboride, aluminum oxide and aluminum.

In order to obtain optimum microstructure the reaction sintering may be carried out under liquid metal, e.g. aluminum. Alternatively, the reaction sintering process may be carried out under an inert atmosphere such as argon, under a reducing atmosphere such as CO, an argon-hydrogen mixture or the like or under vacuum.

Good results with respect to the microstructure and the density of the cermet are obtained when the selected particles have a grain size of smaller than 28 micrometer. Selection of grain size distribution may be carried out according to known techniques, such as cutting off the smallest and biggest particles or by suppressing an intermediate range.

Articles which are produced according to the invention may be obtained from precursor powders comprising an oxide, or a nitride or a hydride of at least one transition metal of the groups IVb, Vb or VIb of the Periodic Table (consisting of titanium, zirconium, hafnium, vanadium, niobium, tantalum, chromium, molybdenum and tungsten). The precursor powder may further comprise a second metal in metallic form and/or a boride, nitride, carbide or silicide of said second metal—such as aluminum boride or aluminum nitride—or a boron-, nitrogen-, carbon- or silicon-containing compound of a non-metallic element such as $B_2O_3$. The reaction-sintered article itself may comprises a boride, nitride, carbide or silicide of said transition metal(s), said second metal in metallic state and/or an oxide, nitride, carbide or silicide of said second metal. The second metal is selected from a group of reducing metals such as aluminum, magnesium, calcium and alkali and other alkaline earth metals. Other examples for compositions of precursor powders and resulting materials are given in references mentioned under the heading "Background of Invention".

For production of e.g. a titanium diboride/aluminum oxide/aluminum cermet a precursor mixture comprising powders of titanium dioxide, boron oxide, and aluminum may be used. Additionally, a non-reactive filler e.g. one of the reaction products such as $TiB_2$ powder may be added to the precursor mixture to control the exothermic heat dissipation on the one hand and to increase the $TiB_2$ content on the other.

The temperature to which the body of pressed precursor powder is heated up may be between 300° C. and 800° C., a preferred temperature range being from 400° C. to 500° C.

Regardless of the nature of the reaction sintering process and the precursor materials employed, cermet bodies of particular shapes, large dimensions, non-uniform compositions or other special configurations may be obtained by a process comprising: providing several individual sub-sections of the precursor shape by a series of first pressing operations of a starting mixture, assembling said individual sections to a pressed precursor shape, pressing said assembled precursor shape in a second pressing operation to a self-sustaining precursor shape, and reaction-sintering the latter.

Herein, the series of first pressing operations may comprise unidirectional pressing and the second pressing operation isostatic pressing. Thus, the major volume decrease during pressing will be absorbed by the less complicated unidirectional pressing operations, and the last densification under isostatic pressure will not require a expensive pressing equipment adapted for large volume changes.

Advantageously, the employed pressure for unidirectional pressing may be chosen between 100 and 1000 kg/cm² and for isostatic pressing between 500 and 5000 kg/cm².

To produce bodies of non-uniform composition, at least one segment may have a different composition of precursor material than the others.

Thus, the reaction sintered article may have one part of increased concentration of $TiB_2$ and another part with increased concentration of metallic aluminum.

To improve mechanical strength of the precursor shape, the individual segments may comprise interengaging surfaces.

The above composite bodies may comprise titanium diboride and aluminum oxide, or titanium diboride, aluminum oxide and aluminum.

The process according to the present invention comprises the presintering of a mixture of starting materials, which leads to a self-sustaining body having sufficient mechanical strength for machining etc. It is believed that the desired consolidation of the starting materials by presintering is achieved at temperatures above approximately ⅔ of the fusion temperature of the lowest melting starting component.

In the case where metallic aluminum is part of the starting mixture, the presintering is carried out at a temperature between 400°–500° C. corresponding to approximately ⅔ of the fusion temperature of aluminum of 660° C. In the case of $B_2O_3$ as used in the examples below, the consolidation may also be supported by the softening thereof at these temperatures. The softening of one of the components of the precursor powder is of advantage for the presintering process, but not a necessary feature limiting the scope of the present invention.

The final procedural step according to the present invention—the reaction sintering of the re-pressed particles—may consist of a metallothermic reduction. In the following examples the reductant is metallic aluminum reducing titanium oxide in presence of boron oxide to form titanium boride and alumina.

EXAMPLES

In the following the invention is described in detail by means of several examples which were carried out on a laboratory scale. The materials obtained by the method according to the present invention have been investigated by microscopy and results are set out after this section.

The starting powders in the following examples were all chosen with a grain size smaller than 325 mesh, i.e. 45 micrometers, however, it is assumed that finer starting powders will yield still finer structures. For the choice of the grain size used for commercial exploitation of the present invention performance requirements, therefore, have to be weighed with economical considerations, since the price of the starting powders rises with the decrease of the grain size.

EXAMPLE 1

A mixture comprising a molar concentration of $3TiO_2 + 3B_2O_3 + 20Al$ was unidirectionally pressed into a pellet under a pressure of 1,6 tons/cm². The pellet was subjected to a pre-sintering heat treatment at 450° C. for 4 hours. The cooled pellet was machined to chips which were subsequently ground and sieved to obtain a powder comprising a particle size of less than 28 micrometers. This powder was isostatically pressed into a shape under a pressure of 1,6 tons/cm². The shape was reaction sintered in an aluminum bath at 1000° C. for 64 hours in inert atmosphere. The material, thus obtained, had a porosity of 0,3% and an absolute density of 3,02 g/cm³. Microphotographic inspection yielded a very fine, regular microstructure with uniform distribution of $TiB_2$, $Al_2O_3$ and Al components.

As comparison to this results, a second sample was prepared without pre-sintering and re-comminuting, whereby the initial pressed mixture as mentioned above was directly submitted to the reaction sintering heat treatment. The porosity of this material was finally 23% and the absolute density was 2,41 g/cm³.

EXAMPLE 2

A mixture comprising a molar concentration of $1B_2O_3:1TiO_2$ was placed in a receptacle made of $Al_2O_3$ without being pressed, just slightly tamped, and subsequently pre-sintered at 450° C. for 4 hours. The material, thus obtained, was then re-ground and sieved to yield a powder of a grain size of equal or more than 28 but less than 45 micrometers. This powder was used together with different quantities of Al to be pressed into pellets at approximately 1,6 tons/cm². After the reaction sintering of these pellets at 960° C. under argon atmosphere for 20 hours in an aluminum bath in most cases the porosity of the obtained material was lower. Thus, the density was higher than for materials of the same composition which were produced without the pre-sintering and regrinding procedure. In addition to that, microphotographic inspection of the microstructure of the materials disclosed that the pre-sintered and re-ground materials had a more homogeneous structure.

The following table shows data for materials of two different Al concentrations each with and without pre-sintering.

| Composition: | $3B_2O_3 + 3TiO_2$ + 10Al | | $3B_2O_3 + 3TiO_2$ + 20Al | |
|---|---|---|---|---|
| Pre-sintering: | Yes | No | Yes | No |
| Density: g/cm² | 3,13 | 2,74 | 2,92 | 2,44 |
| Porosity: open (vol. %) | 2,6 | 11,0 | 1,5 | 17,5 |

EXAMPLE 3

For comparison reasons, a body was produced from a mixture comprising a molar concentration of $3TiO_2$, $3B_2O_3$ and 20Al by a method comprising presintering, macroscopic cutting into chips and reaction sintering but no re-grinding of the presintered material. The mixture was initially pressed into a pellet under a pressure of 1,6 tons/cm². The pellet was subjected to a pre-sintering heat treatment at 450° C. for 7 hours. The cooled pellet was machined to chips which were subsequently directly compacted under a pressure of 1,6 tons/cm² and subjected to the reaction sintering heat treatment under 1000° C. for 12 hours under Al in air. The material, thus obtained, comprised large voids which were only incompletely filled with aluminum. Nevertheless, the density, 3,09 g/cm$^3$, was still good and the porosity was reasonable with 5,7%. The pressing of the chips without re-grinding yields a microstructure after reaction sintering showing an agglomeration of the chips.

EXAMPLE 4

Two final bodies were prepared with slightly different characteristics, each body comprising three segments. Six cylindrical shapes were prepared therefor from a pulverulent mixture having a composition of 3 moles of TiO$_2$, 3 moles of B$_2$O$_3$ and 20 moles of metallic aluminum by a method similar to example 1 except the reaction sintering. The sieved powder obtained from re-grinding was unidirectionally pressed. Three of these six shapes weighed 370 g each and the three remaining ones weighed 350 g.

The unidirectional pressing of the above cylindrical shapes were prepared by filling the pulverulent mixtures into a press comprising a metallic base plate, a metallic outer hollow cylinder resting on the base plate and a metallic inner cylinder consisting of three axially cut segments to be easily removed from the pressed precursor segments and a piston which could be forced under high pressure into the hollow space of the inner, three part cylinder. The inner wall of the inner cylinder was clad with a graphite foil to allow sliding of the powder along the side walls of the press under low friction.

The press was filled and the powder was compressed in a first step, reducing the volume of the sieved precursor powder by approximately a factor 2, then the top surface of the pressed mass was roughened and the free volume of the press was refilled and pressed again.

The force applied to the piston was 8,8 tons, which corresponds to a pressure of 450 kg/cm$^2$. The average density of the pressed cylinders was 1,82 g/cm$^3$.

Two assemblies of three cylinders each, one comprising the three cylinders weighing 370 g each and the other comprising the cylinders of 350 g were prepared by axially aligning those cylinders within rubber hoses which were evacuated and positioned in perforated guiding tubes to assure maintenance of the alignment. The above assemblies were isostatically pressed at a pressure of 2100 kg/cm$^2$. After removal of the guiding tubes and the rubber hoses, the three cylinder segments in each of the above samples adhered to each other. The length of the resulting cylinder made of the 370 g segments was 283 mm and its volume was 5204 mm$^3$. For the sample composed of three segments of 350 g the length was 263 mm, and the volume 4836 mm$^3$. The estimated diameter of both samples was 48,4 mm. The density of the longer cylinder was 2,13 g/cm$^3$, the one for the shorter cylinder was 2,17 g/cm$^3$.

The two samples were subsequently heat treated at 450° C. in order to obtain a mechanically rigid consistence. At this temperature B$_2$O$_3$ is softened sufficiently to provide good bonding between the powder particles. The heat treatment was carried out for twice six hours. The samples were turned upside down after the first six hours.

The pre-sintered but non-reacted samples were stored for several weeks and reaction-sintered subsequently. The reaction-sintering was carried out in the following way: The cylindrical samples as prepared above were surrounded by highly pure aluminum hollow cylinders closed by a top plate of the same material. The entire assembly was positioned within an alumina crucible. The crucible together with its contents was heated up to approximately 950° C. At this temperature the aluminum surrounding each sample was liquified and entered the porous cylinder in which at the same time the reaction $$3TiO_2 + 3B_2O_3 + 20Al \rightarrow 3TiB_2 + 5Al_2O_3 + 10Al$$

took place. The above reaction yielded a porous body comprising two ceramic components and some excess aluminum which, however, could not entirely fill out the pores of the ceramic phase. The aluminum infiltrating from the surrounding aluminum cylinder filled the rest of the pores.

After cooling of the reaction-sintered bodies they were cut in the axial direction and the zones of the joints between two initial segments were investigated. The microphotos show these zones and it is apparent that the microstructure of these zones does not show any perceptible difference to the microstructure of the bulk.

RESULTS

Microphotos were prepared from samples which comprised a joint between two individual sub-sections of identical an differing composition as well as of a joint including positively interlocking surfaces.

The bulk material included partly interconnected ceramic grains in the order of 10 micrometers with inclusions of the metallic phase having a major number of grains in the same order of magnitude, and a few metal agglomerations of approximately 100 micrometers. The microstructure was completely undisturbed in the area of the joint between the two sub-sections, which indicates that the grains formed during the reaction sintering process are not influenced by any inhomogeneities caused by the original joint.

Other microphotos taken from joint areas between sections of different compositions or between sections with interlocking surfaces revealed the same perfect homogeneity of the microstructure in the joint area, whereby only in the case of the sections of different compositions tthe ratio between dark (metal) and light (ceramic) spots was slightly different.

We claim:

1. A method for manufacturing a reaction sintered composite article, comprising a mixture of at least two materials selected from a group consisting of borides, carbides, nitrides or silicides of a first metal being a transition metal of the groups IVb, Vb or VIb of the periodic table (consisting of titanium, hafnium, zirconium, vanadium, niobium, tantalum, chromium, molybdenum and tungsten), a second metal, and an oxide of said second metal, the method comprising providing a particulate precursor mixture leading to the formation of the said mixture of materials upon reaction sintering;

pressing said precursor mixture to a self-sustaining body;

presintering said body by heating it up to a temperature below the temperature at which the reaction sintering is initiated;

comminuting the presintered body;

selecting particles of a suitable grain size distribution;

pressing said particles into shapes of desired size and configuration;

heating said shapes up to a temperature at which the reaction sintering is initiated.

2. The method of claim 1, wherein the composite article is prepared by:

pressing precursor material in a first pressing operation, presintering said pressed precursor material by heating it up to a temperature below the temperature at which reaction sintering is initiated, comminuting the presintered material, selecting particles of a suitable grain size distribution, and pressing said selected particles into shapes of the size of said sub-sections of said article;

assembling a plurality of said sub-sections to a precursor shape;

pressing said precursor shape in a second pressing operation; and heating said pressed precursor shape up to a temperature at which the reaction sintering is initiated.

3. The method of claim 1, wherein the composite article comprises a metal selected from aluminum, magnesium, calcium and alkali and other alkaline earth metals.

4. The method of claim 3, wherein the composite article comprises titanium diboride, aluminum oxide and aluminum.

5. The method of claim 4, wherein the reaction sintering is carried out under liquid aluminum.

6. The method of claim 4, wherein the sintering is carried out under inert atmosphere.

7. The method of claim 4, wherein the selected particles have a grain size of smaller than 28 micrometer.

8. The method of claim 4, wherein the precursor mixture comprises an oxide, or a nitride or a hydride of at least one transition metal of the groups IVb, Vb or VIb of the Periodic Table (consisting of titanium, hafnium, zirconium, vanadium, niobium, tantalum, chromium, molybdenum and tungsten); a second metal in metallic state and/or a boride, nitride, carbide or silicide of said second metal or a boron-, nitrogen-, carbon or silicon-containing compound of a non-metallic element, the reaction-sintered article comprising a boride, nitride, carbide or silicide of said transition metal(s), said second metal in metallic state and/or an oxide, nitride, carbide or silicide of said second metal.

9. The method of claim 8, wherein the precursor mixture comprises powders of titanium dioxide, boron oxide, and aluminum.

10. The method of claim 9, wherein the precursor mixture further comprises a powder of $TiB_2$.

11. The method of claim 8, wherein the presintering is carried out at a temperature between 300° C. and 800° C.

12. The method of claim 11, wherein the temperature is between 400° C. and 500° C., at which said $B_2O_3$ is in softened state.

13. A reaction sintered composite article comprising a mixture of at least two materials selected from borides, carbides, nitrides or silicides of a first metal being a transition metal of the groups IVb, Vb or VIb of the periodic table (consisting of titanium, hafnium, zircinium, vanadium, niobium, tantalum, chromium, molybdenum and tungsten), a second metal, and an oxide of said second metal, wherein the microstructure of said article has a uniform distribution of single, non-agglomerated grains of the reaction products of the sinter reaction.

14. The article of claim 13, wherein the micro-structure has been obtained by providing a particulate precursor mixture leading to the formation of the said mixture of materials upon reaction sintering; pressing said precursor mixture into a self-sustaining body; presintering said body by heating it up to a temperature below the temperature at which the reaction sintering is initiated; comminuting the presintered body; selecting particles of a suitable grain size distribution; pressing said particles to shapes of desired size and configuration; and heating said shapes up to a temperature at which the reaction sintering is initiated.

15. The article of claim 13, prepared by pressing precursor material in a first pressing operation, presintering said pressed precursor material by heating it up to a temperature below the temperature at which the reaction sintering is initiated, comminuting the presintered material, selecting particles of a suitable grain size distribution, and pressing said selected particles into shapes of the size of sub-sections of said body, assembling said sub-sections to said precursor shape, pressing said precursor shape in a second pressing operation, and heating said pressed precursor shape up to a temperature at which reaction sintering is initiated.

16. The article of claim 13, wherein the composite material comprises titanium diboride, aluminum oxide and aluminum.

17. The article of claim 13, wherein the composite material comprises a component in an aluminum electrowinning cell, which component is normally exposed to molten aluminum.

18. The article of claim 14, wherein the composite material comprises a component in an aluminum electrowinning cell, which component is normally exposed to molten aluminum.

* * * * *